(12) United States Patent
Lian

(10) Patent No.: US 10,802,804 B2
(45) Date of Patent: Oct. 13, 2020

(54) FILE GENERATION METHOD, DEVICE, SERVER, AND STORAGE MEDIUM

(71) Applicant: ONE CONNECT SMART TECHNOLOGY CO., LTD.(SHENZHEN), Shenzhen (CN)

(72) Inventor: Li Lian, Shenzhen (CN)

(73) Assignee: ONE CONNECT SMART TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/484,469

(22) PCT Filed: Feb. 7, 2018

(86) PCT No.: PCT/CN2018/075547
§ 371 (c)(1),
(2) Date: Aug. 8, 2019

(87) PCT Pub. No.: WO2018/145635
PCT Pub. Date: Aug. 16, 2018

(65) Prior Publication Data
US 2020/0034126 A1    Jan. 30, 2020

(30) Foreign Application Priority Data
Feb. 8, 2017   (CN) .......................... 2017 1 0069561

(51) Int. Cl.
*G06F 8/41*     (2018.01)
*G06F 40/186*   (2020.01)
(Continued)

(52) U.S. Cl.
CPC ............ *G06F 8/427* (2013.01); *G06F 8/4434* (2013.01); *G06F 16/116* (2019.01);
(Continued)

(58) Field of Classification Search
CPC ...... G06F 8/427; G06F 8/4434; G06F 16/907; G06F 16/116; G06F 16/252; G06F 40/186
See application file for complete search history.

(56) References Cited

U.S. PATENT DOCUMENTS 6,611,838 B1 *   8/2003   Ignat ..................... G06F 16/254
8,533,690 B2 *   9/2013   McAtamney ............. G06F 8/51
                                                      717/137
(Continued)

FOREIGN PATENT DOCUMENTS

CN         101650711 A      2/2010
CN         103473108 A     12/2013
(Continued)

OTHER PUBLICATIONS

International Search Report dated May 10, 2018 in the corresponding PCT application (application No. PCT/CN2018/075547).

*Primary Examiner* — Chat C Do
*Assistant Examiner* — Douglas M Slachta
(74) *Attorney, Agent, or Firm* — Kilpatrick Townsend & Stockton, LLP

(57) ABSTRACT

A file generation method and device, a server, and a non-volatile computer readable storage medium having computer readable instructions stored thereon. The method comprises: acquiring a metadata file, and parsing the metadata file to obtain the metadata and a specified file format (302); according to the mapping relation between field information and source code parameters configured in the metadata file, converting the metadata into corresponding source code (304); according to the specified file format, invoking a corresponding meta template, and according to the parsed metadata and the invoked meta template, generating a corresponding interaction file template (306); and according to (Continued)

the source code and the interaction file template, generating an interaction file (308).

18 Claims, 6 Drawing Sheets

(51) Int. Cl.
  *G06F 16/907* (2019.01)
  *G06F 16/11* (2019.01)
  *G06F 16/25* (2019.01)
(52) U.S. Cl.
  CPC .......... *G06F 16/252* (2019.01); *G06F 16/907* (2019.01); *G06F 40/186* (2020.01)

(56) References Cited

U.S. PATENT DOCUMENTS

| | | | |
|---|---|---|---|
| 8,789,012 B1* | 7/2014 | Tolle | G06F 8/30 717/106 |
| 9,483,260 B1 | 11/2016 | Hale et al. | |
| 10,073,826 B2* | 9/2018 | Ramesan | H04L 67/02 |
| 2004/0025167 A1* | 2/2004 | Grow | G06F 16/252 719/310 |
| 2004/0225491 A1* | 11/2004 | Chang | G06F 40/186 704/2 |
| 2008/0037047 A1 | 2/2008 | Condon et al. | |
| 2008/0127070 A1* | 5/2008 | Barcia | G06F 9/4492 717/116 |
| 2010/0192124 A1* | 7/2010 | Hall | G06F 8/30 717/106 |
| 2012/0324422 A1* | 12/2012 | Chartier | G06F 8/75 717/109 |
| 2013/0054630 A1* | 2/2013 | Briggs | G06F 16/2452 707/760 |
| 2017/0102925 A1* | 4/2017 | Ali | G06F 8/30 |
| 2017/0220327 A1* | 8/2017 | Allen | G06F 8/41 |
| 2018/0081654 A1* | 3/2018 | Kudriavtsev | G06F 8/51 |

FOREIGN PATENT DOCUMENTS

| | | |
|---|---|---|
| CN | 104281447 A | 1/2015 |
| CN | 104615751 A | 5/2015 |
| CN | 104750796 A | 7/2015 |
| CN | 104933162 A | 9/2015 |
| CN | 105930323 A | 9/2016 |
| CN | 106354727 A | 1/2017 |

* cited by examiner

FILE GENERATION METHOD, DEVICE, SERVER, AND STORAGE MEDIUM

CROSS-REFERENCE TO RELATED APPLICATION

This application is a U.S. National Stage of International Application No. PCT/CN2018/075547, filed on Feb. 7, 2018, designating the United States, which claims priority to Chinese Patent Application No. 2017100695610, filed with the Chinese Patent Office on Feb. 8, 2017 and entitled "METHODS AND APPARATUSES FOR GENERATING A FILE", both of which are incorporated herein by reference in their entireties.

FIELD

The present disclosure relates to the field of computer technology, and in particular to methods and apparatuses for generating a file, servers and storage mediums.

BACKGROUND

With the development of science and technology, the system platform has become more and more powerful. Usually a system platform interacts with multiple associated systems and files to transfer some business data. For example, a sales system platform interacts with multiple asset-side systems to transfer business data.

However, different association systems support different file formats, such as CSV (Comma-Separated Values) and CSDC (China Securities Depository and Clearing). Then, it is necessary to write a separate set of code for each file format to generate the corresponding format of the interaction file. Obviously, the traditional way to compose multiple complex sets of code to generate interaction files causes code redundancy and management difficulty.

SUMMARY

According to various embodiments disclosed in this application, methods, apparatuses for generating a file, servers, and non-transitory storage medium are provided.

A method for generating a file includes:

acquiring a metadata file, parsing the metadata file to obtain metadata and a specified file format;

converting the metadata into a corresponding source code according to a mapping relationship between field information and source code parameters configured in the metadata file;

invoking a corresponding metadata template according to the specified file format, and generating a corresponding interaction file template according to the metadata obtained by parsing and the invoked metadata template; and generating an interaction file according to the source code and the interaction file template.

An apparatus for generating a file includes:

a parsing module, configured to acquire a metadata file, parsing the metadata file to obtain metadata and a specified file format;

a source code generating module, configured to convert the metadata into a corresponding source code according to a mapping relationship between field information and source code parameters configured in the metadata file;

an interaction file template generating module is configured to invoke a corresponding metadata template according to the specified file format, and generate a corresponding interaction file template according to the metadata obtained by parsing and the invoked metadata template; and an interaction generating a file module is configured to generate an interaction file according to the source code and the interaction file template.

A server includes a memory and one or more processors, the memory storing computer-readable instructions that, when executed by the one or more processors, causing the one or more processors to perform the following steps:

acquiring a metadata file, parsing the metadata file to obtain metadata and a specified file format;

converting the metadata into a corresponding source code according to a mapping relationship between field information and source code parameters configured in the metadata file;

invoking a corresponding metadata template according to the specified file format, and generating a corresponding interaction file template according to the metadata obtained by parsing and the invoked metadata template; and generating an interaction file according to the source code and the interaction file template.

One or more non-transitory computer-readable storage medium storing computer-readable instructions that, when executed by one or more processors, causing the one or more processors to perform the following steps:

acquiring a metadata file, parsing the metadata file to obtain metadata and a specified file format;

converting the metadata into a corresponding source code according to a mapping relationship between field information and source code parameters configured in the metadata file;

invoking a corresponding metadata template according to the specified file format, and generating a corresponding interaction file template according to the metadata obtained by parsing and the invoked metadata template; and generating an interaction file according to the source code and the interaction file template.

The details of at least an embodiment of the present disclosure will be presented with reference to the following drawings and description. Other characteristic and advantages of the present disclosure will be more apparent from the specification, drawings and claims.

BRIEF DESCRIPTION OF THE DRAWINGS

To illustrate the embodiments of the present disclosure more clearly, the accompanying drawings for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The present disclosure will be described in details in combination with the accompanying drawings and embodiments of the present disclosure will be more apparent. It should be understood that the particular embodiments are described for the purpose of illustrating as opposed to restricting the present disclosure.

Figure 1:
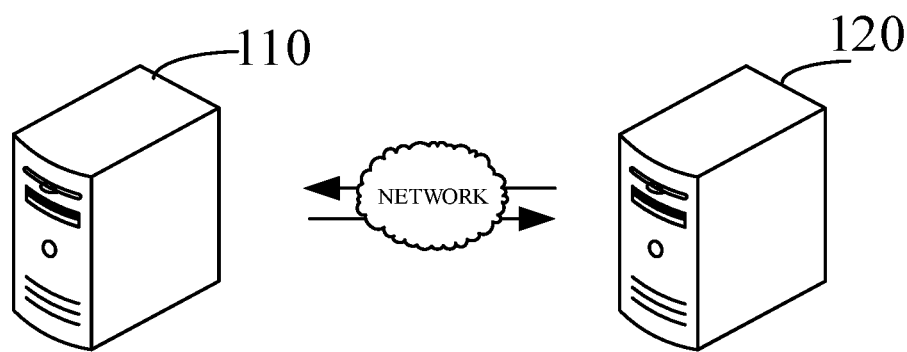
FIG. 1 is a schematic diagram of an application environment of method for generating a file according to an embodiment.

FIG. 1 is a schematic diagram of an application environment of method for generating a file according to an embodiment. As shown in FIG. 1, the server 110 communicates with the associated server 120 over the network. The server 110 acquires a metadata file, parses the metadata file to obtain the metadata and the specified file format, converts the metadata into the corresponding source code according to the mapping relationship between the field information and the source code parameter configured in the metadata file. The server 110 invokes the corresponding meta-template according to the specified file format, and generates the corresponding interaction file template according to the parsed metadata and the invoked meta-template. Further, the server 110 generates interaction files according to the source code and the interaction file templates. Further, the server 110 may send the generated interaction file to the associated server 120.

Figure 2:
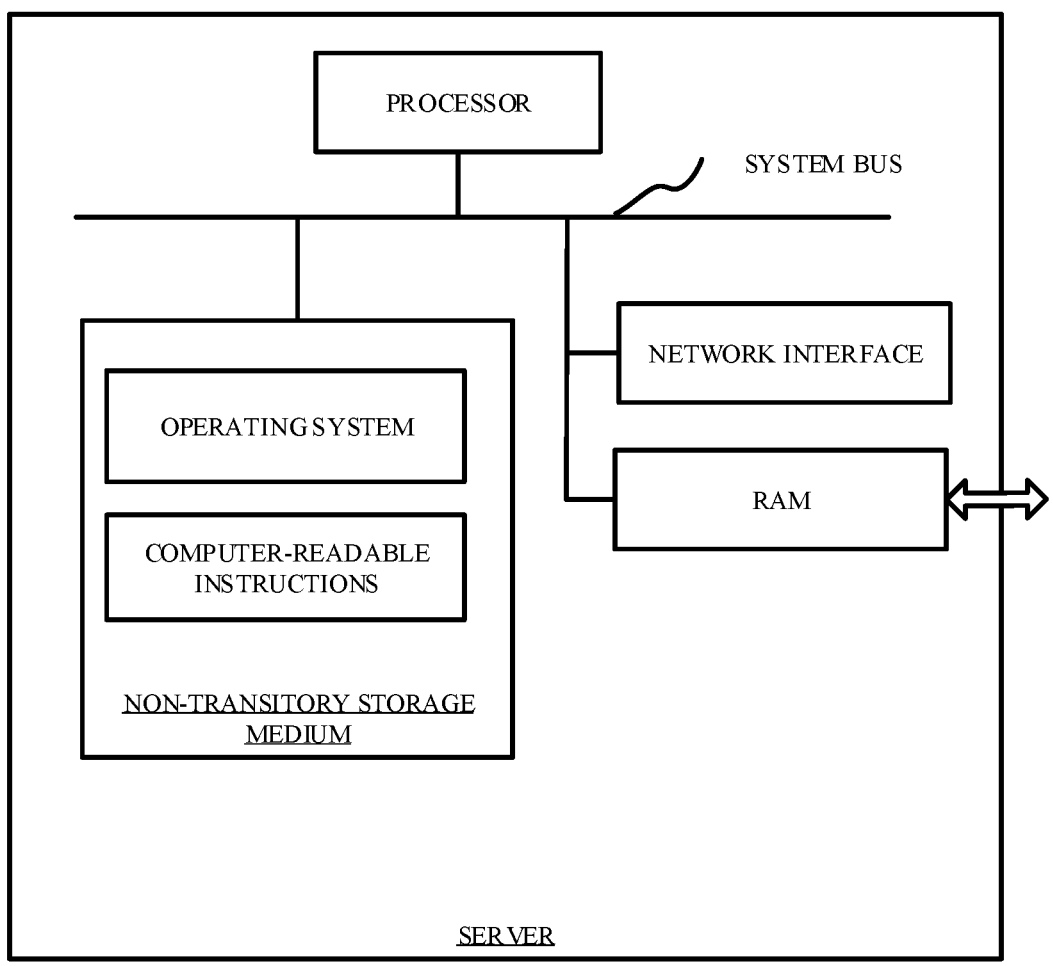
FIG. 2 is a schematic diagram of a server according to an embodiment.

FIG. 2 is schematic diagram of a server according to an embodiment. The computer device includes a processor, a memory, and a network interface connected through a system bus. The processor of the computer device is configured to provide calculation and control capabilities. The memory of the computer device includes a non-transitory storage medium and a random access memory (RAM). The non-transitory storage medium stores an operating system and computer-readable instructions. The RAM provides an environment for the operation of the operating system and the computer-readable instructions in the non-transitory storage medium. The network interface of the computer device is configured to communicate with an external terminal through a network connection. The computer-readable instructions are executed by the processor to implement a method for generating a file.

Those skilled in the art will appreciate that the structure shown in FIG. 2 is merely a block diagram of a portion of the structure associated with the solution of the present disclosure, and does not constitute a limitation on the computer device to which the solution of the present disclosure is applied, a particular computer device may include more or less components, or combine certain components, or with a different arrangement of components.

Figure 3:
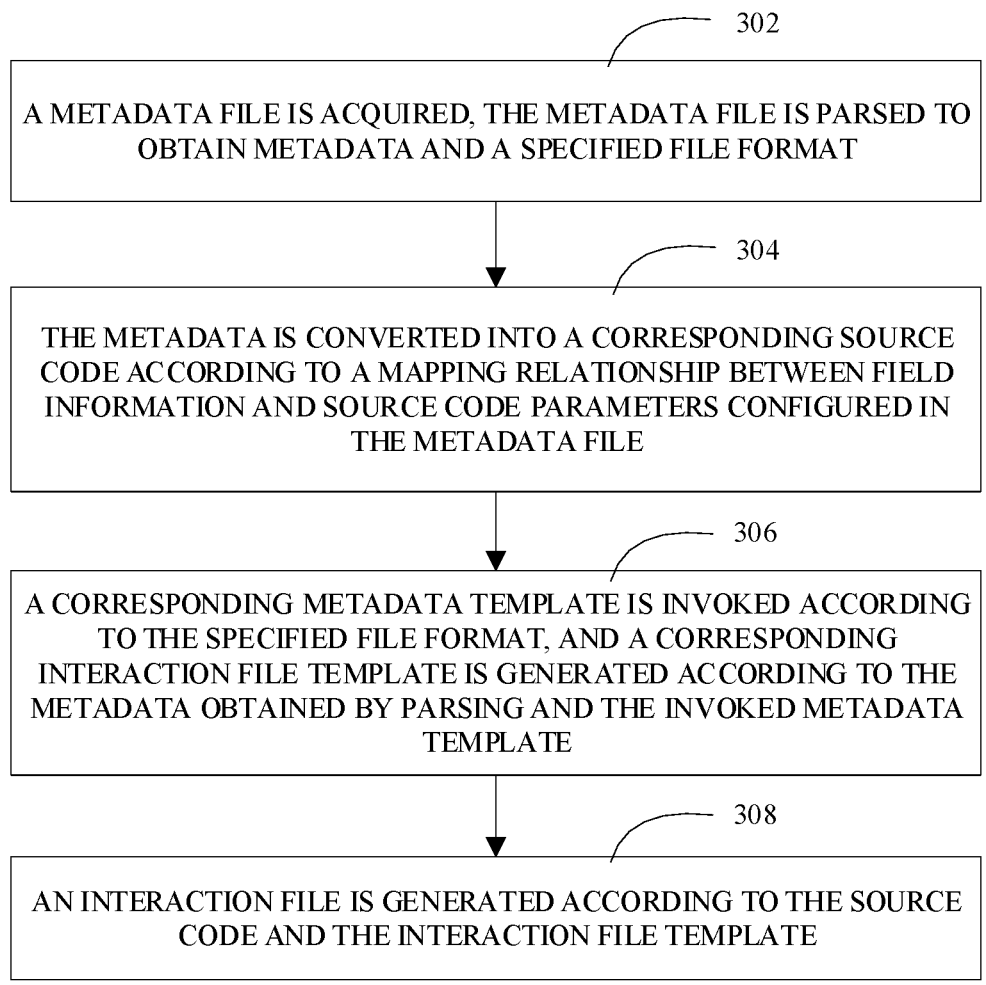
FIG. 3 is a flowchart of a method for generating a file according to an embodiment.

As shown in FIG. 3, in an embodiment, a method for generating a file is provided, which is now illustrated being applied to the server shown in FIG. 1 or FIG. 2. The method specifically includes the following steps:

At step 302, a metadata file is acquired, the metadata file is parsed to obtain metadata and a specified file format.

In the embodiment, the metadata file corresponding to an interaction matter is pre-configured in the server.

It should be noted that the interaction matter is a matter that involves data interaction with an associated system. For example, when an account opening application is filed to the associated system, it is required to send the relevant data of the account opening application to the associated system, therefore the account opening application is an interaction matter.

Specifically, metadata files in Excel format can be configured. The metadata file has metadata and the specified file format stored therein.

When a server sends the interaction file to the associated system for a certain interaction matter, it acquires the metadata file corresponding to the interaction matter and parses the metadata file through a metadata parser to obtain the metadata and the specified file format. The specified file format includes CSV format, CSDC format, etc.

For example, in order to generate an account opening application interaction file, the metadata file corresponding to the account opening application file is acquired, and the metadata file is parsed to obtain the metadata related to the account opening application file and the specified file format. For example, the application series number, personal ID type, organization ID type, transaction date, and attribute information of each field can be obtained, the attribute information of the field includes the data type, length, and Chinese description of the field.

At step 304, the metadata is converted into a corresponding source code according to a mapping relationship between field information and source code parameters configured in the metadata file.

In the embodiment, a mapping relationship between field information and source code parameters is pre-configured in the metadata file. For example, metadata includes field IDs, field names, field data types, field lengths, field Chinese descriptions, and notes. The mapping relationship between the field information and the source code parameters can be as follows:

header.id=ID
header.name=field name
header.type=type
header.length=length
header.commentName=description
header.notes=notes It should be understood that the metadata file may be a whole file, or may be a general name of multiple files. For example, the metadata file may include a first metadata file in an Excel format and a second metadata file configured with a mapping relationship between field information and source code parameters.

Further, the server converts the metadata to the corresponding source code according to the mapping relationship.

At step 306, a corresponding metadata template is invoked according to the specified file format, and a corresponding interaction file template is generated according to the metadata obtained by parsing and the invoked metadata template.

In the embodiment, meta templates corresponding to various file formats are pre-configured in the server. For example, a corresponding meta template A is configured for the CSDC format and a corresponding meta template B is configured for the CSV format. The server invokes the corresponding meta template according to the obtained specified file format. The metadata template is a template file that can be substituted with metadata.

Further, the server generates the corresponding interaction file template according to the parsed metadata and the invoked meta template.

In an embodiment, the step of generating the corresponding interaction file template according to the metadata obtained by parsing and the invoked metadata template includes: the metadata is substituted into the metadata template, a display mode of a field in the metadata is determined according to the metadata template, and a field display position of the field in the metadata is determined in the metadata template; and header information in the metadata is added to a file header of the metadata template to obtain the interaction file template.

In the embodiment, the server substitutes metadata into the metadata template, determines a display mode of each field in the metadata substituted according to a preset logic in the metadata template, and determines a corresponding field display position of each field in the metadata in the metadata template.

Specifically, the metadata template determines the character padding and/or the date display format and/or the amount display format corresponding to the field according to the data type of each field in the metadata. Further, the character padding mode includes that when the data type corresponding to the field is a numeric type, the field corresponds to a padding mode of zero digit character left padding and right aligning, and when the data type corresponding to the field is a character type, the field corresponds to an adjustment of space character right padding and left aligning.

Further, the metadata includes file header information, and the server adds the file header information to the file header of the metadata template.

The interaction file template can be obtained according to the foregoing processing.

At step 308, an interaction file is generated according to the source code and the interaction file template.

Further, the server generates the final data interaction file according to the generated source code and interaction file template. Specifically, the server acquires a data value corresponding to each field in the metadata according to the source code and by an application program, and inserts the acquired data value into a corresponding location in the interaction file template to generate the interaction file. In the embodiment, a corresponding interaction file template is automatically generated by combining metadata with metadata template, and the data value is automatically inserted into the interaction file according to source code generated from metadata, thereby improving efficiency of generating the interaction file.

It should be understood that the source code is generated according to metadata conversion, and the metadata can be configured to locate and look up the data value corresponding to the field. Therefore, the data value corresponding to each field in the metadata can be acquired according to the source code generated by the metadata conversion. Further, the interaction file template is obtained by substituting metadata into the metadata template and determining the field display location and display mode of each field from the metadata template. Therefore, the data value corresponding to the field can be correspondingly inserted into the corresponding field display location in the interaction file template.

According to the foregoing method for generating a file, a metadata file is acquired, the metadata file is parsed to obtain metadata and a specified file format; the metadata is converted into a corresponding source code according to a mapping relationship between field information and source code parameters configured in the metadata file; a corresponding metadata template is invoked according to the specified file format, and a corresponding interaction file template is generated according to the metadata obtained by parsing and the invoked metadata template; and an interaction file is generated according to the source code and the interaction file template. This is equivalent to specifying the file format in the metadata file, and combining the metadata in the metadata file with the metadata template corresponding to the specified file format to generate the interaction file template dynamically, and further generating the interaction file by combining the source code after metadata translation and the interaction file template. Since it is not necessary to write a set of interaction file code for generating a corresponding format for each file format, the written amount of code is reduced, and the redundancy of the code is avoided.

In addition, the corresponding interaction file templates are generated automatically according to the metadata instead of manually configuring multiple sets of fixed interaction file templates, which improves the efficiency of interaction file template generation compared with manually configuring multiple sets of interaction file templates.

Figure 4:
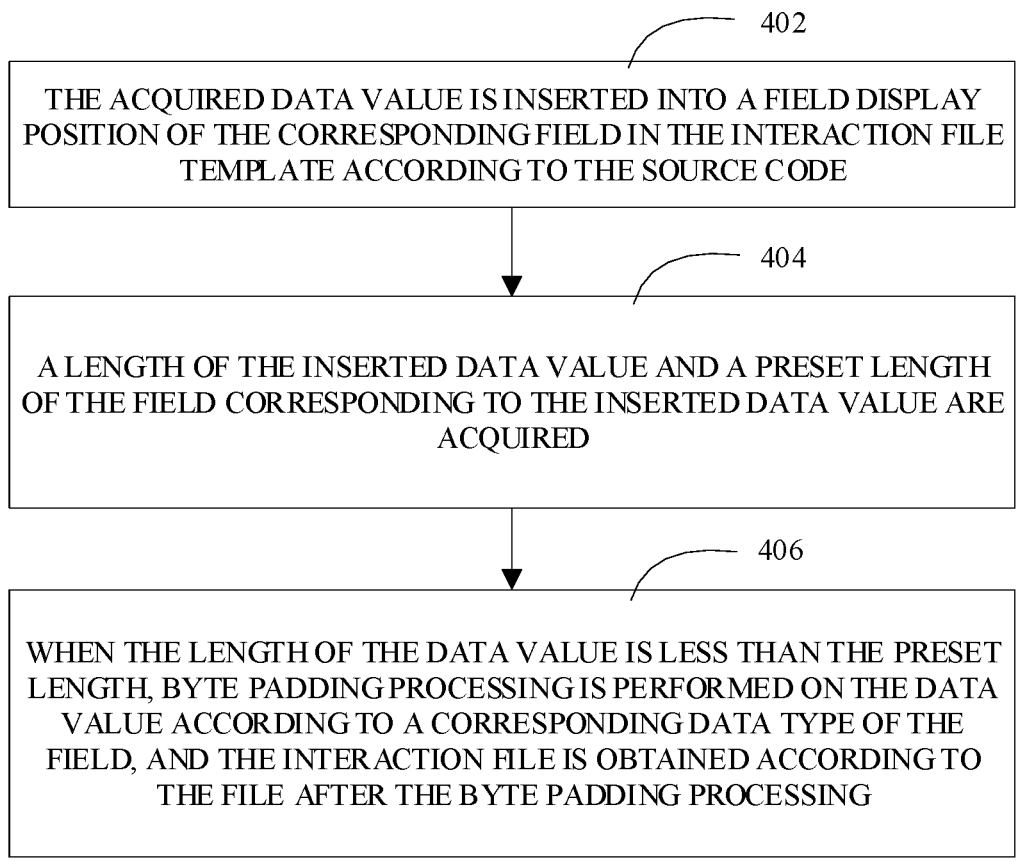
FIG. 4 is a flowchart of a character padding processing step according to an embodiment.

As shown in FIG. 4, in an embodiment, the step of inserting the acquired data value into the corresponding location in the interaction file template to generate the interaction file includes the step of character padding processing, which specifically includes the following steps:

At step 402, the acquired data value is inserted into a field display position of the corresponding field in the interaction file template according to the source code.

In the embodiment, the server inserts the acquired data value into the field display location of the corresponding field in the interaction file template according to the source code, for example, inserting the acquired data value "No. XXX, XXX Road, Nanshan District, Shenzhen, Guangdong Province" in to the field display location corresponding to the "Communication address" field in the interaction file template.

At step 404, a length of the inserted data value and a preset length of the field corresponding to the inserted data value are acquired.

It is to be understood that the file format can be categorized into of non-fixed length and fixed length according to whether the field length is restricted or not. The fixed length is a preset length is specified for each field. Then, for the file format with fixed length requirement for field length, corresponding length detection and corresponding padding processing are carried out. In the embodiment, the file format has a fixed length requirement for the field length.

Further, the server acquires the length of the inserted data value and the preset length of the field corresponding to the inserted data value. It may be understood that the interaction file template is formed by substituting metadata into the metadata template, and the metadata includes a field length (that is, a preset length of a field). Therefore, the server may acquire a preset length corresponding to the corresponding field after inserting the data value into the corresponding field.

At step 406: character padding processing is performed to the data value according to a corresponding data type of the field when the length of the data value is less than the preset length, and the interaction file is obtained according to the file after the character padding processing.

Further, the server compares the length of the inserted data value with the preset length of the corresponding field. When the length of the data value is less than the preset length of the corresponding field, the server performs character padding to the data value according to the data type of the corresponding field. The character padding processing means that the length of the data value is equal to the preset length by adding padding byte length.

Further, the interaction file is obtained from the file after character padding processing. It may be understood that the file after character padding processing may be directly used as the interaction file, or it is also possible to detect the date display format and/or the amount display format of the inserted data value, adjust the same to a date display format and/or an amount display format corresponding to the field, and obtain the interaction file according to the format-adjusted file.

In the embodiment, when the acquired data value is inserted into the interaction file template, character padding processing is performed to the data value using the data type of the field corresponding to the data value, so that the generated interaction file is more accurate.

In an embodiment, the step of performing the character padding processing to the data value according to the corresponding data type of the field includes the step of detecting the data type of the field corresponding to the inserted data value; performing zero digit character left padding and right aligning processing to the data value when the data type corresponding to the field is a numeric type; and performing space character right padding and left aligning processing to the data value when the data type corresponding to the field is a character type.

In the embodiment, the server detects the data type of the field corresponding to the inserted data value. Zero digit character left padding and right aligning processing is performed to the data value when the data type corresponding to the field is a numeric type, for example, if the preset length is 8 bytes and the data value is an integer value of "668886", the zero digit character left padding and right aligning processing is performed to the data value to be "00668886" without affecting the value and also satisfies the fixed length of 8 corresponding to the field.

Further, when the data type corresponding to the field is a character type, a space character right padding and left aligning processing is performed to the data value, for example, the field "Communication address" corresponds to a preset length of 120 bytes, while the actual data value (that is, the actual address) is 110 bytes in length. In this case, the space character right padding and left aligning processing is required to be performed to the data value to 120 bytes.

In an embodiment, the step of inserting the acquired data value into the corresponding location in the interaction file template to generate the interaction file includes: the acquired data value is inserted into a field display position of the corresponding field in the interaction file template according to the source code, whether the date display format and/or the amount display format of the inserted data value is consistent with the date display format and/or the amount display format of the corresponding field is detected, if not, the date display format and/or the amount display format of the inserted data value are adjusted to the date display format and/or the amount display format corresponding to the corresponding field, and the interaction file is obtained according to the format adjusted.

Figure 5:
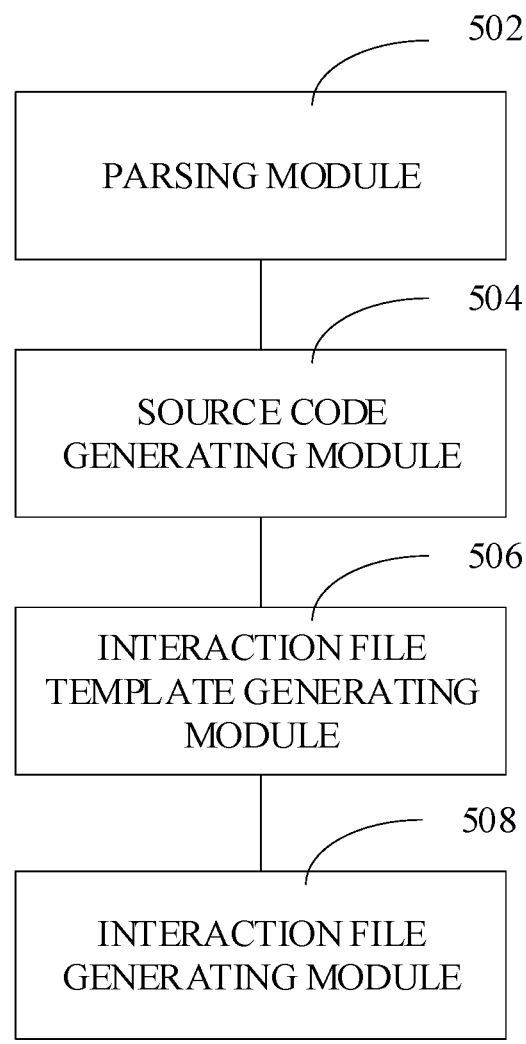
FIG. 5 is a block diagram of an apparatus for generating a file according to an embodiment.

As shown in FIG. 5, in an embodiment, an apparatus for generating a file is provided, which includes a parsing module 502, a source code generating module 504, an interaction file template generating module 506, and an interaction file generating module 508.

The parsing module 502 is configured to obtain a metadata file and parse the metadata file to obtain metadata and a specified file format.

The source code generating module 504 is configured to convert metadata into corresponding source code according to a mapping relationship between field information and source code parameters configured in the metadata file.

The interaction file template generating module 506 is configured to invoke a corresponding metadata template according to the specified file format, and generate a corresponding interaction file template according to the metadata obtained by parsing and the invoked metadata template.

The interaction file generating module 508 is configured to generate an interaction file according to the source code and the interaction file template.

In an embodiment, the interaction file template generating module 506 is further configured to substitute the metadata into the metadata template, determine a display mode of a field in the metadata according to the metadata template, and determine a field display position of the field in the metadata in the metadata template; and add file header information in the metadata to a file header of the metadata template to obtain the interaction file template.

In an embodiment, the interaction file generating module 508 is further configured to acquire a data value corresponding to each field in the metadata according to the source code, and insert the acquired data value into a corresponding location in the interaction file template to generate the interaction file.

Figure 6:
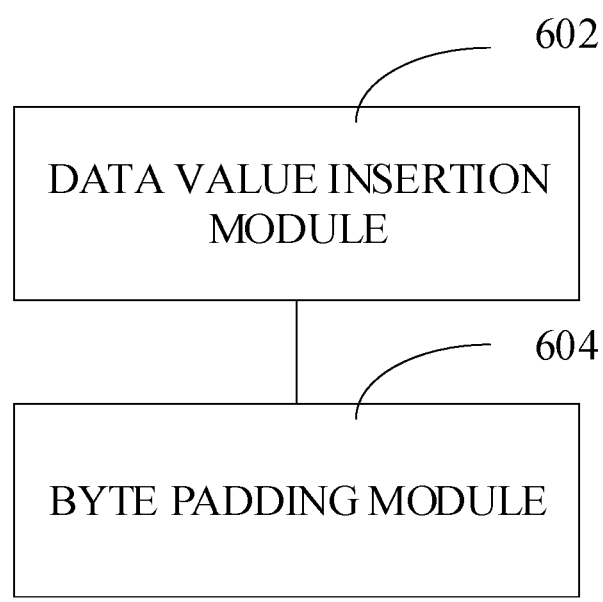
FIG. 6 is a block diagram of an interaction file generating module according to an embodiment.

As shown in FIG. 6, in an embodiment, the interaction file generating module 508 includes:

A data value insertion module 602 configured to insert the acquired data value into the field display position of the corresponding field in the interaction file template according to the source code.

A character padding module 604 configured to acquire a length of the inserted data value and a preset length of the field corresponding to the inserted data value; and perform character padding processing to the data value according to a corresponding data type of the field when the length of the data value is less than the preset length, and obtain the interaction file according to the file after the character padding processing.

In an embodiment, the character padding module 604 is further configured to detect the data type of the field corresponding to the inserted data value; perform zero digit character left padding and right aligning processing to the data value when the data type corresponding to the field is a numeric type; and perform space character right padding and left aligning processing to the data value when the data type corresponding to the field is a character type.

For specific definition of the apparatus for generating a file, reference may be made to the definition of the above method for generating a file, and details are omitted for brevity. Each of the modules in the apparatus for generating a file described may be entirely or partially implemented by software, hardware, or a combination thereof. Each of the modules may be embedded in or independent of the processor in the computer device in the form of hardware, or may be stored in the memory in the computer device in the form of software, so that the processor invokes and executes the operations corresponding to each of the modules.

A server includes a memory and one or more processors, the memory stores computer-readable instructions that, when executed by the processor, cause the one or more processors perform the following steps: acquiring a metadata file, parsing the metadata file to obtain metadata and a specified file format; converting the metadata into a corresponding source code according to a mapping relationship between field information and source code parameters configured in the metadata file; invoking a corresponding metadata template according to the specified file format, and generating a corresponding interaction file template according to the metadata obtained by parsing and the invoked metadata template; and generating an interaction file according to the source code and the interaction file template.

In an embodiment, the step that the corresponding interaction file template is generated according to the metadata obtained by parsing and the invoked metadata template includes the metadata is substituted into the metadata template, a display mode of a field in the metadata is determined according to the metadata template, and a field display position of the field in the metadata in the metadata template is determined; and file header information in the metadata is added to a file header of the metadata template to obtain the interaction file template.

In an embodiment, the display mode of the field includes character padding mode and/or a date display format and/or an amount display format.

In an embodiment, the step that the interaction file is generated according to the source code and the interaction file template includes: a data value corresponding to each field in the metadata is acquired according to the source code, and the acquired data value is inserted into a corresponding location in the interaction file template to generate an interaction file.

In an embodiment, the step that the acquired data value is inserted into the corresponding location in the interaction file template to generate the interaction file includes: the acquired data value is inserted into a field display position of the corresponding field in the interaction file template according to the source code; a length of the inserted data value and a preset length of the field corresponding to the inserted data value are acquired; and character padding processing is performed to the data value according to a corresponding data type of the field when the length of the data value is less than the preset length, and the interaction file is obtained according to the file after the character padding processing.

In an embodiment, the step that the character padding processing is performed to the data value according to the corresponding data type of the field includes: the data type of the field corresponding to the inserted data value is detected; zero digit character left padding and right aligning processing is performed to the data value when the data type corresponding to the field is a numeric type; and space character right padding and left aligning processing is performed to the data value when the data type corresponding to the field is a character type.

One or more non-transitory computer-readable storage medium storing computer-readable instructions that, when executed by one or more processors, cause one or more processors to perform the following steps: acquiring a metadata file, parsing the metadata file to obtain metadata and a specified file format; converting the metadata into a corresponding source code according to a mapping relationship between field information and source code parameters configured in the metadata file; invoking a corresponding metadata template according to the specified file format, and generating a corresponding interaction file template according to the metadata obtained by parsing and the invoked metadata template; and generating an interaction file according to the source code and the interaction file template.

In an embodiment, the step that the corresponding interaction file template is generated according to the metadata obtained by parsing and the invoked metadata template includes the metadata is substituted into the metadata template, a display mode of a field in the metadata is determined according to the metadata template, and a field display position of the field in the metadata in the metadata template is determined; and file header information in the metadata is added to a file header of the metadata template to obtain the interaction file template.

In an embodiment, the display mode of the field includes character padding mode and/or a date display format and/or an amount display format.

In an embodiment, the step that the interaction file is generated according to the source code and the interaction file template includes: a data value corresponding to each field in the metadata is acquired according to the source code, and the acquired data value is inserted into a corresponding location in the interaction file template to generate an interaction file.

In an embodiment, the step that the acquired data value is inserted into the corresponding location in the interaction file template to generate the interaction file includes: the acquired data value is inserted into a field display position of the corresponding field in the interaction file template according to the source code; a length of the inserted data value and a preset length of the field corresponding to the inserted data value are acquired; and character padding processing is performed to the data value according to a corresponding data type of the field when the length of the data value is less than the preset length, and the interaction file is obtained according to the file after the character padding processing.

In an embodiment, the step that the character padding processing is performed to the data value according to the corresponding data type of the field includes: the data type of the field corresponding to the inserted data value is detected; zero digit character left padding and right aligning processing is performed to the data value when the data type corresponding to the field is a numeric type; and space character right padding and left aligning processing is performed to the data value when the data type corresponding to the field is a character type.

It should be appreciated that the various steps are not necessarily performed sequentially in the order indicated by the reference numbers of the steps. The performance of these steps is not critical to the order in which they are performed unless explicitly stated herein, and the steps may be performed in other orders. Moreover, at least a part of the steps may include a plurality of sub-steps or stages, which are not necessarily performed at the same time, but may be performed at different times, and the order in which the sub-steps or stages are performed is not necessarily performed sequentially, but may be performed in turns or alternatively with other steps or at least a part of sub-steps or stages of other steps Persons of ordinary skill in the art understand that all or part of the processes in the methods of the foregoing embodiments may be implemented by a computer program instructing relevant hardware. The computer program may be stored in a non-transitory computer-readable storage medium. When the computer program is executed, flows of embodiments of the methods as described above may be included. Any references to memory, storage, databases, or other medium used in the various embodiments provided herein may include non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Memory Bus (Rambus) Direct RAM (RDRAM), Direct Memory Bus Dynamic RAM (DRDRAM), Memory Bus Dynamic RAM (RDRAM) etc.

The foregoing respective features involved in the respective embodiments can be combined arbitrarily, for brevity, not all possible combinations of the respective features in the foregoing embodiments are described, however, to the extent they have no collision with each other, the combination of the respective features shall be considered to be within the scope of the description.

The foregoing implementations are merely specific embodiments of the present disclosure, and are not intended to limit the protection scope of the present disclosure. It should be noted that any variation or replacement readily figured out by persons skilled in the art within the scope disclosed in the present disclosure shall all fall into the protection scope of the present disclosure. Therefore, the protection scope of the present disclosure shall be subject to the protection scope of the claims.

The invention claimed is:

1. A method for generating an interaction file, comprising:
acquiring a metadata file, parsing the metadata file to obtain metadata and a specified file format;
converting the metadata into a corresponding source code according to a mapping relationship between field information and source code parameters configured in the metadata file;
invoking a corresponding metadata template according to the specified file format, and generating a corresponding interaction file template according to the metadata obtained by parsing and the invoked metadata template; and
generating the interaction file according to the source code and the interaction file template.

2. The method according to claim 1, wherein the generating the corresponding interaction file template according to the metadata obtained by parsing and the invoked metadata template comprises:
substituting the metadata into the metadata template, determining a display mode of a field in the metadata according to the metadata template, and determining a field display position of the field in the metadata in the metadata template; and
adding file header information in the metadata to a file header of the metadata template to obtain the interaction file template.

3. The method according to claim 2, wherein the display mode of the field comprises a character padding mode and/or a date display format and/or an amount display format.

4. The method according to claim 1, wherein the generating the interaction file according to the source code and the interaction file template comprises:
acquiring a data value corresponding to each field in the metadata according to the source code, and inserting the acquired data value into a corresponding location in the interaction file template to generate the interaction file.

5. The method according to claim 4, wherein the inserting the acquired data value into the corresponding location in the interaction file template to generate the interaction file comprises:
inserting the acquired data value into the field display position of the corresponding field in the interaction file template according to the source code;
acquiring a length of the inserted data value and a preset length of the field corresponding to the inserted data value; and
performing character padding processing to the data value according to a corresponding data type of the field when the length of the data value is less than the preset length, and obtaining the interaction file according to the file after the character padding processing.

6. The method according to claim 5, wherein the performing the character padding processing to the data value according to the corresponding data type of the field comprises:
detecting the data type of the field corresponding to the inserted data value;
performing zero digit character left padding and right aligning processing to the data value when the data type corresponding to the field is a numeric type; and
performing space character right padding and left aligning processing to the data value when the data type corresponding to the field is a character type.

7. A server, comprising a memory and one or more processors, the memory storing computer-readable instructions that, when executed by the one or more processors, causing the one or more processors to perform the following steps:
acquiring a metadata file, parsing the metadata file to obtain metadata and a specified file format;
converting the metadata into a corresponding source code according to a mapping relationship between field information and source code parameters configured in the metadata file;
invoking a corresponding metadata template according to the specified file format, and generating a corresponding interaction file template according to the metadata obtained by parsing and the invoked metadata template; and
generating an interaction file according to the source code and the interaction file template.

8. The server according to claim 7, wherein the generating the corresponding interaction file template according to the metadata obtained by parsing and the invoked metadata template comprises:
substituting the metadata into the metadata template, determining a display mode of a field in the metadata according to the metadata template, and determining a field display position of the field in the metadata in the metadata template; and
adding file header information in the metadata to a file header of the metadata template to obtain the interaction file template.

9. The server according to claim 8, wherein the display mode of the field comprises a character padding mode and/or a date display format and/or an amount display format.

10. The server according to claim 7, wherein the generating the interaction file according to the source code and the interaction file template comprises:
acquiring a data value corresponding to each field in the metadata according to the source code, and inserting the acquired data value into a corresponding location in the interaction file template to generate the interaction file.

11. The server according to claim 10, wherein the inserting the acquired data value into the corresponding location in the interaction file template to generate the interaction file comprises:
  inserting the acquired data value into the field display position of the corresponding field in the interaction file template according to the source code;
  acquiring a length of the inserted data value and a preset length of the field corresponding to the inserted data value; and
  performing character padding processing to the data value according to a corresponding data type of the field when the length of the data value is less than the preset length, and obtaining the interaction file according to the file after the character padding processing.

12. The server according to claim 11, wherein the performing the character padding processing on the data value according to the corresponding data type of the field comprises:
  detecting the data type of the field corresponding to the inserted data value;
  performing zero digit character left padding and right aligning processing to the data value when the data type corresponding to the field is a numeric type; and
  performing space character right padding and left aligning processing to the data value when the data type corresponding to the field is a character type.

13. One or more non-transitory computer-readable storage medium storing computer-readable instructions that, when executed by one or more processors, causing the one or more processors to perform the following steps:
  acquiring a metadata file, parsing the metadata file to obtain metadata and a specified file format;
  converting the metadata into a corresponding source code according to a mapping relationship between field information and source code parameters configured in the metadata file;
  invoking a corresponding metadata template according to the specified file format, and generating a corresponding interaction file template according to the metadata obtained by parsing and the invoked metadata template; and
  generating an interaction file according to the source code and the interaction file template.

14. The storage medium according to claim 13, wherein the generating the corresponding interaction file template according to the metadata obtained by parsing and the invoked metadata template comprises:
  substituting the metadata into the metadata template, determining a display mode of a field in the metadata according to the metadata template, and determining a field display position of the field in the metadata in the metadata template; and
  adding file header information in the metadata to a file header of the metadata template to obtain the interaction file template.

15. The storage medium according to claim 14, wherein the display mode of the field comprises a character padding mode and/or a date display format and/or an amount display format.

16. The storage medium according to claim 13, wherein the generating the interaction file according to the source code and the interaction file template comprises:
  acquiring a data value corresponding to each field in the metadata according to the source code, and inserting the acquired data value into a corresponding location in the interaction file template to generate the interaction file.

17. The storage medium according to claim 16, wherein the inserting the acquired data value into the corresponding location in the interaction file template to generate the interaction file comprises:
  inserting the acquired data value into the field display position of the corresponding field in the interaction file template according to the source code;
  acquiring a length of the inserted data value and a preset length of the field corresponding to the inserted data value; and
  performing character padding processing to the data value according to a corresponding data type of the field when the length of the data value is less than the preset length, and obtaining the interaction file according to the file after the character padding processing.

18. The storage medium according to claim 17, wherein the performing the character padding processing to the data value according to the corresponding data type of the field comprises:
  detecting the data type of the field corresponding to the inserted data value;
  performing zero digit character left padding and right aligning processing to the data value when the data type corresponding to the field is a numeric type; and
  performing space character right padding and left aligning processing to the data value when the data type corresponding to the field is a character type.

* * * * *